United States Patent
Burckart et al.

(10) Patent No.: US 9,734,124 B2
(45) Date of Patent: Aug. 15, 2017

(54) DIRECT LINKED TWO WAY FORMS

(75) Inventors: Erik J. Burckart, Durham, NC (US);
Andrew J. Ivory, Durham, NC (US);
Todd E. Kaplinger, Durham, NC (US);
Aaron K. Shook, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1385 days.

(21) Appl. No.: 12/717,837

(22) Filed: Mar. 4, 2010

(65) Prior Publication Data

US 2011/0219077 A1 Sep. 8, 2011

(51) Int. Cl.
*G06F 15/16* (2006.01)

(52) U.S. Cl.
CPC .................................. *G06F 15/16* (2013.01)

(58) Field of Classification Search
CPC ............... G06F 15/16; G06F 17/30873; H04L 27/2689; H04L 27/2692; H04L 27/2694
USPC ................ 709/204–206, 231, 232, 227, 228; 715/759, 751, 752–758
See application file for complete search history.

(56) References Cited

U.S. PATENT DOCUMENTS

| | | | | |
|---|---|---|---|---|
| 6,446,113 B1* | 9/2002 | Ozzie et al. | | 709/204 |
| 6,640,241 B1* | 10/2003 | Ozzie et al. | | 709/204 |
| 6,859,821 B1* | 2/2005 | Ozzie et al. | | 709/205 |
| 8,051,178 B2* | 11/2011 | Skidgel | | 709/227 |
| 2003/0061286 A1* | 3/2003 | Lin | | 709/205 |
| 2003/0217171 A1* | 11/2003 | Von Stuermer et al. | | 709/231 |
| 2003/0225836 A1* | 12/2003 | Lee et al. | | 709/205 |
| 2005/0021626 A1* | 1/2005 | Prajapat et al. | | 709/205 |
| 2005/0097159 A1* | 5/2005 | Skidgel | | 709/200 |
| 2009/0164581 A1* | 6/2009 | Bove et al. | | 709/205 |
| 2010/0174783 A1* | 7/2010 | Zarom | | 709/205 |

* cited by examiner

*Primary Examiner* — Kenneth R Coulter
(74) *Attorney, Agent, or Firm* — Steven M. Greenberg, Esq.; CRGO Law

(57) ABSTRACT

A method for managing a two-way form over a direct link is provided. The method includes establishing a communicative link between two communications clients each separately executing in memory by a processor of a corresponding one of two computers. The method also includes managing a two-way form rendered as individual instances of the two-way form each in a corresponding content browser executing in a corresponding one of the two computers. Finally, the method includes exchanging synchronization information for the two-way form over the communicative link. In one aspect of the embodiment, the method also includes prompting in one of the individual instances of the two-way form for verification of an update to a field providing in another of the individual instances of the two-way form. In another aspect of the embodiment, the method includes recording a verification of the update to the field in an audit trail.

13 Claims, 1 Drawing Sheet

DIRECT LINKED TWO WAY FORMS

BACKGROUND OF THE INVENTION

The present invention broadly relates to the field of content co-browsing and more particularly relates to the field of two-way form management over a computer communications network.

Content distribution refers to the distribution of content over a computer communications network. The advent of the World Wide Web resulted in the explosive growth of content distribution over the global Internet to the extent that the electronic distribution of content now far outnumbers the print distribution of content. The most general circumstance of content distribution is the venerable Web page transmitted to a requesting client from a source server over the Internet for rendering and viewing by an end user in a Web browser. For many, the only form of content distribution experienced with significant frequency is the "surfing" of traditional Web pages.

Notwithstanding, the Internet and particularly the World Wide Web provide for an ideal environment for collaborative computing. To facilitate collaborative computing, co-browsing technologies have experienced considerable growth as a reliable tool permitting multiple different users to cooperatively view content distributed about the World Wide Web. Co-browsing tools permit remotely disposed users to direct the retrieval and display of content simultaneously in respective content browsers in a coordinated fashion such that one end user directs the retrieval of the content for viewing by all participating users.

In as much as the conventional operating system and Web browser inhibit co-browsing largely for reasons of security. To achieve the effect of co-browsing, end users when compelled can rely upon screen sharing and application sharing technologies in remote presentation tools and remote access tools. Notwithstanding, advanced features of co-browsing tools generally are absent in remote presentation tools and remote access tools, such as coordinated playback of streaming media objects and frame and portlet support.

Two-way forms represent a naturally outgrowth of co-browsing and provide a substantial mechanism for the customer relationship management industry. Two-way forms essentially are forms based content renderable in two different content browsers for two, geographically remote end users such that the user input provided in one field of the two-way form can be visible in the same field of the same two-way form rendered in a separate content browser by a collaborating end user. Two-way forms have been implemented in the past using the open source "dojo" toolkit including commercially available implementations such as the communications enabled application (CEA) dojo toolkit manufactured by International Business Machines Corporation of Armonk, N.Y., United States of America.

BRIEF SUMMARY OF THE INVENTION

In an embodiment of the invention, a method for managing a two-way form over a direct link is provided. The method includes establishing a communicative link between two communications clients each separately executing in memory by a processor of a corresponding one of two computers. The method also includes managing a two-way form rendered as individual instances of the two-way form each in a corresponding content browser executing in a corresponding one of the two computers. Finally, the method includes exchanging synchronization information for the two-way form over the communicative link. In one aspect of the embodiment, the method also includes prompting in one of the individual instances of the two-way form for verification of an update to a field providing in another of the individual instances of the two-way form. In another aspect of the embodiment, the method includes recording a verification of the update to the field in an audit trail.

In another embodiment of the invention, a direct link two-way form data processing system is provided. The system includes two computers, each with at least one processor and memory and each hosting execution of a content browser. The system also includes a two-way form of separate instances each rendered in a corresponding content browser hosted in a corresponding one of the computers. Finally, the system includes a communications client executing in each of the computers to establish a communicative link directly between the computers, the communications link supporting an exchange of synchronization information for the two-way form. In one aspect of the embodiment, the communications clients are voice over Internet protocol (VoIP) clients. In another aspect of the embodiment, the communications clients are instant messaging clients.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Generally, two different end users remotely disposed from one another can establish a communicative link between one another over a computer communications network. A content browser session can be maintained for each of the end users so as to render content acquired from over the computer communications network. The communicative link can include, by way of example, a VoIP telephone call, or an instant messaging session. A data channel within the communicative link can be used to pass synchronization information pertaining to each content browser so that the state of each content browser session becomes linked. Finally, a two-way form can be passed to both content browser sessions and synchronization information requisite to managing the two-way form can be transmitted over the data channel of the communicative link directly between the end users rather than relying upon a central database to store the synchronization information of the two-way form.

Figure 1:
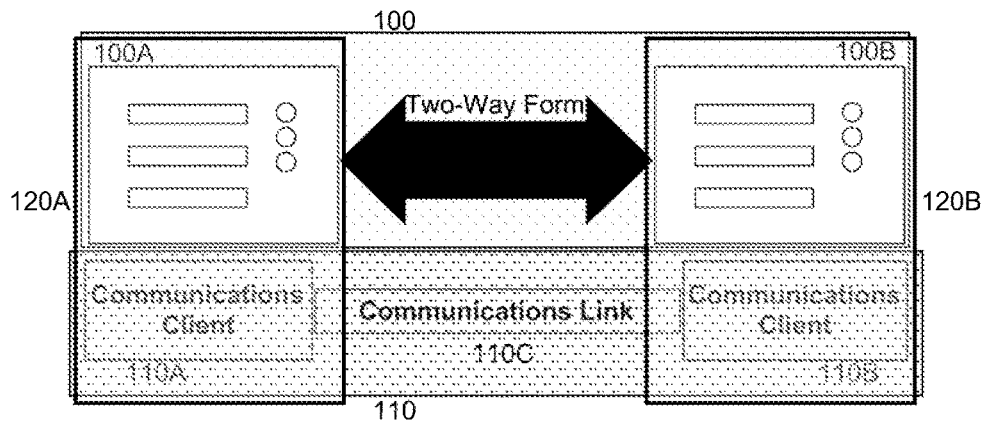
FIG. 1 is a schematic illustration of a two-way form data processing system configured for direct linked two-way forms; and, FIG. 2 is a flow chart illustrating a process for managing direct linked two-way forms.

In further illustration, FIG. 1 schematically depicts a two-way form data processing system configured for direct linked two-way forms. The system can include two different computers 120A, 120B, each corresponding to a different end user. Each of the computers 120A, 120B can include memory and at least one processor such that each of the computers 120A, 120B can support the execution of an operating system that further can host the operation of one or more applications including a content browser, for example a Web browser. Each of the computers 120A, 120B also can include a network adapter configured to permit data communications between applications hosted by the operating system and data sources about a data communications network such as the global Internet.

A communications session 110 can be established between the computers 120A, 120B, for example a VoIP based click-to-call telephony session, or an instant messaging session. The communications session 110 can utilize a communications link 110C existing between communications clients 110A, 110B executing in corresponding ones of the computers 120A, 120B. In the circumstance of a VoIP click-to-call telephony, each of the communications clients 110A, 110B can include a softphone. Alternatively, in the circumstance of an instant messenger, each of the communications clients 110A, 110B can include an instant messaging client. In either circumstance, though, the communications session 110 can support the exchange of data between the communications clients 110A, 110B in the respective computers 120A, 120B.

Of note, a two-way form 100 can be established between the computers 120A, 120B and respectively rendered in a hosted content browser. The two-way form 100 can include different form instances 100A, 100B of the same form with the content of each field of the form being synchronized there between according to synchronization information. However, instead of relying upon the placement of the synchronization information in a central database common to both computers 120A, 120B, the synchronization information can be passed directly between the computers 120A, 120B over the communications link 110C utilizing the communications session 110.

In an aspect of the embodiment, at least one of the fields of the form instances 100A, 100B can be configured through associated programmatic code such as a script or markup to prompt for verification of content provided in the field of one form instance 100B through the corresponding field in the other form instance 100A. For example, the programmatic code can provide upon a change of focus from the field in the one form instance 100B to issue a prompt in the other form instance 100A for a verification of the content in the field. In another aspect of the embodiment, the verification responsive to the prompt can be recorded in an audit trail.

Figure 2:
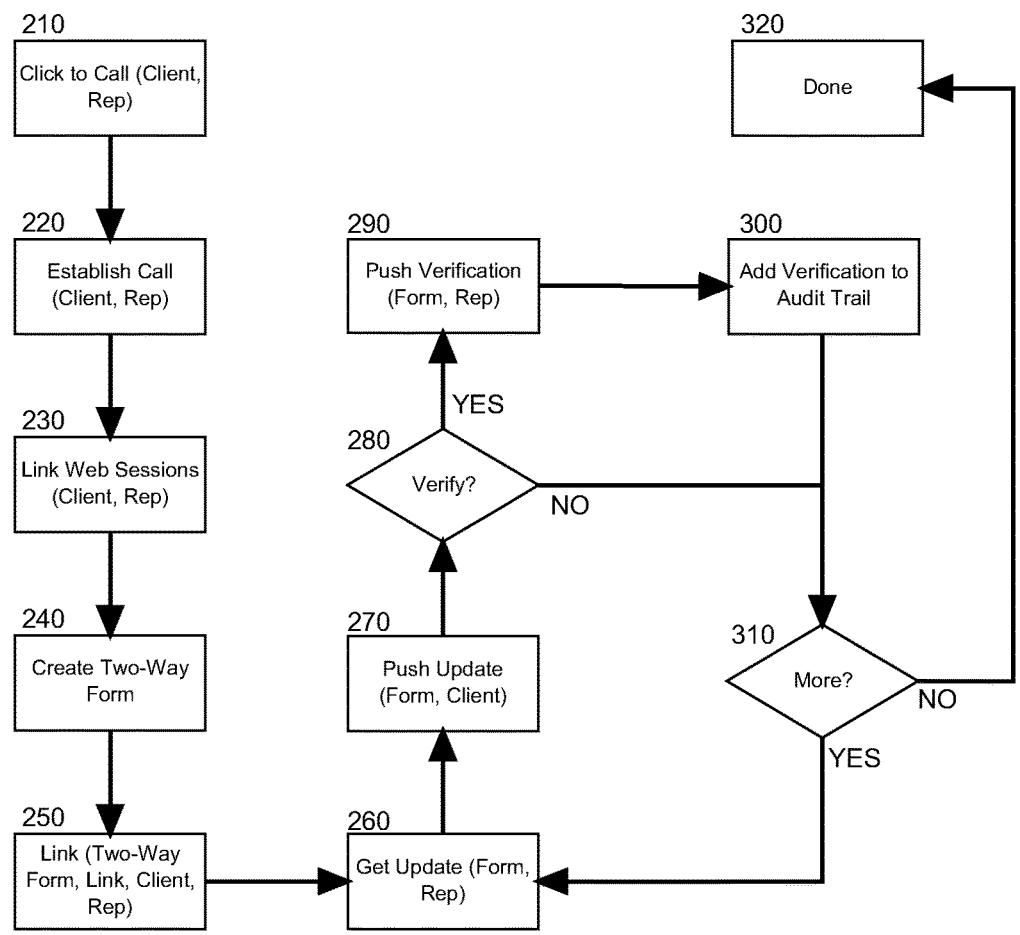

In further illustration a use-case embodiment of the invention, FIG. 2 is a flow chart depicting a process for direct link two-way form processing in the data processing system of FIG. 1. Referring to FIG. 2, beginning in block 210, a click-to-call request can be received in a Web server providing content to a Web browser of a client. The click-to-call request can indicate a target representative in a call center and in block 220 the Web server in response to the click-to-call request can direct the establishment of a VoIP call between the representative in the call center and the client. Once the VoIP call has been established, in block 230 Web sessions for both the client and the representative can be linked for communication over the VoIP call.

In block 240, a two-way form can be created in both Web sessions of the client and the representative so that separate instances of the same form can be synchronized in both Web sessions of the client and the representative, respectively. In block 250, the link over the VoIP call can be utilized to provide synchronization information for the two-way form and in block 260, a first update can be detected for a field in the instance of the two-way form in the Web browser of the representative. In block 270, the updated content for the field can be provided over link provided by the VoIP call to the corresponding field in the instance of the two-way form present in the Web browser of the client.

In decision block 270 the client can be prompted to verify the content updated for the field of the form, for example by assuring a proper name, address, credit card information, etc. If the client chooses to verify the content updated for the field of the form, in block 290, an indication of verification can be transmitted over the link provided by the VoIP call to the representative. Additionally, the indication of verification by the client can be written to a record in an audit trail, as illustrated in block 300. In decision block 310, if additional updates are to be provided for the fields of the two-way form, the process can repeat through block 260. Otherwise, the process can end in block 320.

As will be appreciated by one skilled in the art, the present invention may be embodied as a method, data processing system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

We claim:

1. A method for managing a two-way form over a direct link comprising:
   establishing a communicative link directly between two communications clients, each communication client separately executing in memory by a processor of a corresponding one of two computers;
   managing a two-way form rendered as individual instances of the two-way form each in a corresponding content browser executing in the corresponding one of two computers; wherein the two-way form is form based content renderable in two different content browsers for two, geographically remote end users such that the user input provided in one field of the two-way form is visible in the same field of the same two-way form rendered in a separate content browser by a collaborating end user; and,
   exchanging synchronization information for the two-way form over the communicative link by passing the synchronization information directly between the two computers, instead of relying upon the synchronization information being placed in a central database common to the two computers.

2. The method of claim 1, wherein the communications clients comprise voice over Internet protocol (VoIP) clients.

3. The method of claim 1, wherein the communications clients comprise instant messaging clients.

4. The method of claim 1, further comprising prompting in one of the individual instances of the two-way form for verification of an update to a field providing in another of the individual instances of the two-way form.

5. The method of claim 4, further comprising recording a verification of the update to the field in an audit trail.

6. A direct link two-way form data processing system comprising:
   two computers, each with at least one processor and memory and each hosting execution of a content browser;

a two-way form of separate instances, each separate instance of the two-way form rendered in a corresponding content browser hosted in a corresponding one of the two computers, wherein the two-way form is form based content renderable in two different content browsers for two, geographically remote end users such that the user input provided in one field of the two-way form is visible in the same field of the same two-way form rendered in a separate content browser by a collaborating end user; and, a communications client executing in each of the computers to establish a communicative link directly between the two computers, the communications link supporting an exchange of synchronization information for the two-way form by passing the synchronization information directly between the two computers, instead of relying upon the synchronization information being placed in a central database common to the two computers.

7. The system of claim 6, wherein the communications clients are voice over Internet protocol (VoIP) clients.

8. The system of claim 6, wherein the communications clients are instant messaging clients.

9. A computer program product for managing a two-way form over a direct link, the computer program product comprising:

a non-transitory computer readable storage medium having computer readable program code embodied therewith, the computer readable program code comprising:

computer readable program code for establishing a communicative link directly between two communications clients, each communications client separately executing in memory by a processor of a corresponding one of two computers;

computer readable program code for managing a two-way form rendered as individual instances of the two-way form each in a corresponding content browser executing in the corresponding one of two computers, wherein the two-way form is form based content renderable in two different content browsers for two, geographically remote end users such that the user input provided in one field of the two-way form is visible in the same field of the same two-way form rendered in a separate content browser by a collaborating end user; and, computer readable program code for exchanging synchronization information for the two-way form over the communicative link by passing the synchronization information directly between the two computers, instead of relying upon the synchronization information being placed in a central database common to the two computers.

10. The computer program product of claim 9, wherein the communications clients comprise voice over Internet protocol (VoIP) clients.

11. The computer program product of claim 9, wherein the communications clients comprise instant messaging clients.

12. The computer program product of claim 9, further comprising computer readable program code for prompting in one of the individual instances of the two-way form for verification of an update to a field providing in another of the individual instances of the two-way form.

13. The computer program product of claim 12, further comprising computer readable program code for recording a verification of the update to the field in an audit trail.

\* \* \* \* \*